W. C. VAN DRESSER.
REBORING TOOL.
APPLICATION FILED APR. 25, 1921.

1,433,577.

Patented Oct. 31, 1922.

Inventor
William C. Van Dresser
By Ralph J. Burton
Attorney

Patented Oct. 31, 1922.

1,433,577

UNITED STATES PATENT OFFICE.

WILLIAM C. VAN DRESSER, OF DETROIT, MICHIGAN, ASSIGNOR TO VAN DRESSER BROTHERS, A COPARTNERSHIP COMPOSED OF SAID WILLIAM C. VAN DRESSER, WESLEY B. VAN DRESSER, AND FRANK P. VAN DRESSER, A COPARTNERSHIP OF MICHIGAN.

REBORING TOOL.

Application filed April 25, 1921. Serial No. 464,156.

*To all whom it may concern:*

Be it known that I, WILLIAM C. VAN DRESSER, a citizen of the United States, residing at Detroit, county of Wayne, State of Michigan, have invented certain new and useful Improvements in Reboring Tools, of which the following is a specification.

My invention relates to reboring tools. It pertains particularly to the cutter head and its means of connection with the feed spindle, and is here shown as embodied in a reboring tool particularly adapted to ream worn cylinders.

The object is to provide a reboring tool in which the cutter head may be drawn to a seat concentric the axis of the feed spindle without any eccentric thrust being exerted thereon.

A further object is the provision of a reboring tool in which the cutter and its means of connection with the feed bar is of simple, inexpensive construction comprising a minimum of parts and so constructed that the cutter head may be quickly and easily centered and seated relative said spindle concentric the axis thereof.

A further object is the provision of such a type of cutter head provided with means for easily and quickly and accurately adjusting the radial extension of the cutter knives simultaneously.

These and other objects, together with the details of construction will more fully appear from the following description, appended claims and accompanying drawings, in which:

Figure 1:
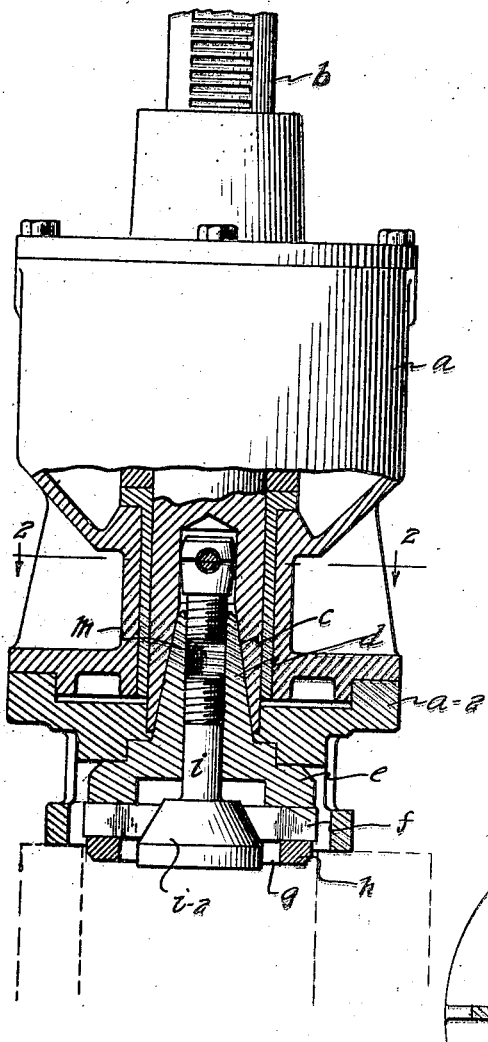
Fig. 1 is an elevation, partly broken away, showing a vertical section through the cutter head.

It is commonly found construction in reboring tools, for the shank of the cutter head to be threaded into the feed spindle. Under such circumstances, wear of the parts, or inaccurate threading of the cutter head shank or seat of the feed spindle, will throw the cutter head off center, an eccentric thrust being exerted thereon, and the reboring operation resulting from the use of such a tool will be inaccurate. I provide a cutter and spindle and connecting means intended to overcome these disadvantages.

In the drawings, let $a$ indicate the reboring tool housing, here shown as being provided in two sections, the lower section being indicated as $a^2$. This housing is adapted to be secured to a cylinder block, indicated in dotted outline in the drawing. The feed spindle is indicated as $b$, such spindle being journalled in the housing and adapted to be advanced therethrough in the reboring operation. At its lower end, this spindle is provided with an axial recess $c$, the wall of which provides a smooth bearing seat for the tapered shank $d$ of a cutter head $e$.

This cutter head is provided with a series of radially disposed, adjustable knives $f$, provided in such number as may be desired, and carried in radially arranged recesses in the head. An annular, circumferential groove is provided in the face of the head, within which is received a split, beveled ring, held in place by means of screws, or other means, which serves as a lead ring, and is provided in desired diameter to fit the bore of the cylinder with which it is desired to use the cutter. This ring is indicated as $h$.

The shank of the cutter head is provided with an axial, threaded passageway $m$, and into the lower end thereof is engaged, the threaded end of a centering piece $i$, the upper beveled portion $i^2$ of which engages the ends of the cutter knives, to expand said knives simultaneously to regulate the radial adjustment of the cutter knives to the desired diameter.

Figure 2:
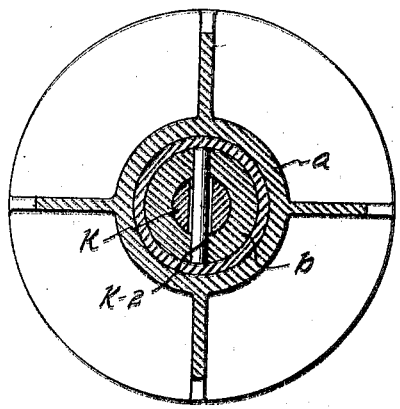
Fig. 2 is a horizontal section taken on line 2—2 of Fig. 1.

The principal feature of my invention consists in the provision of a universal floating coupling, in the form of a draw-bolt $k$, pivoted in the upper portion of the recess in the feed spindle as shown in Fig. 2. The head of the draw bolt, through which the pivot pin $k^2$ extends, is tapered in each direction from the pivot point, so as to permit of limited floating movement of the draw-bolt on the pin, the pin of less diameter than the diameter of the pin way through which it extends to such an extent as to permit of play thereon. The lower end of the draw-bolt is threaded to engage in the end of the axial threaded passageway $m$ in the cutter head shank, and as the cutter head is threaded upwardly thereon it is drawn to a seat in the conical recess in the feed spindle concentric the axis thereof.

In the operation of the device, the cutter head is drawn to a seat accurately and positively relative the feed spindle without the exertion of any side thrust tending to throw the same off center, which would not normally be the result were the cutter head shank threaded into the threaded opening in the spindle.

What I claim is:

1. In a reboring tool, in combination, a feed spindle journalled for rotation, said feed spindle provided at one end with a recessed seat tapered concentric the axis of the spindle, a cutter head provided with a tapered shank adapted to seat within said recess in the spindle, said cutter head provided with an axial threaded passageway, a threaded coupling mounted within said spindle by means of a universal joint so as to rotate therewith, said coupling adapted to be threaded into the axial passageway in the cutter head to draw the same to a seat concentric the axis of the spindle.

2. In a reboring tool, a rotatable spindle having a tapered tool shank seat concentric its axis, a tool shank adapted to seat therein, coupling means pivoted to the spindle to rotate therewith and arranged to extend axially within the tool shank seat but having a limited universal floating movement therein, said coupling means threaded to engage the tool shank to draw the same to a seat within the spindle.

3. In a reboring tool, in combination, a rotatable spindle formed with a conical tool shank seat concentric its axis, a universally mounted coupling carried thereby to rotate therewith arranged to extend axially within said seat, a tapered tool shank adapted to be engaged by said coupling and drawn to a seat concentric the axis of the spindle.

4. In a reboring tool, a spindle capable of rotatable advancement and so formed at one end as to provide a seat for the shank of a tool concentric its axis, a tool shank adapted to seat therein, a coupling member carried by the spindle to rotate therewith and having a permitted limited floating movement relative thereof, said coupling member adapted to engage the tool shank to draw the same to its seat in the spindle.

WILLIAM C. VAN DRESSER.